REUBEN A. BRIGGS, OF NEW YORK, N. Y., ASSIGNOR TO EDWY E. HAMMOND, OF SAME PLACE.

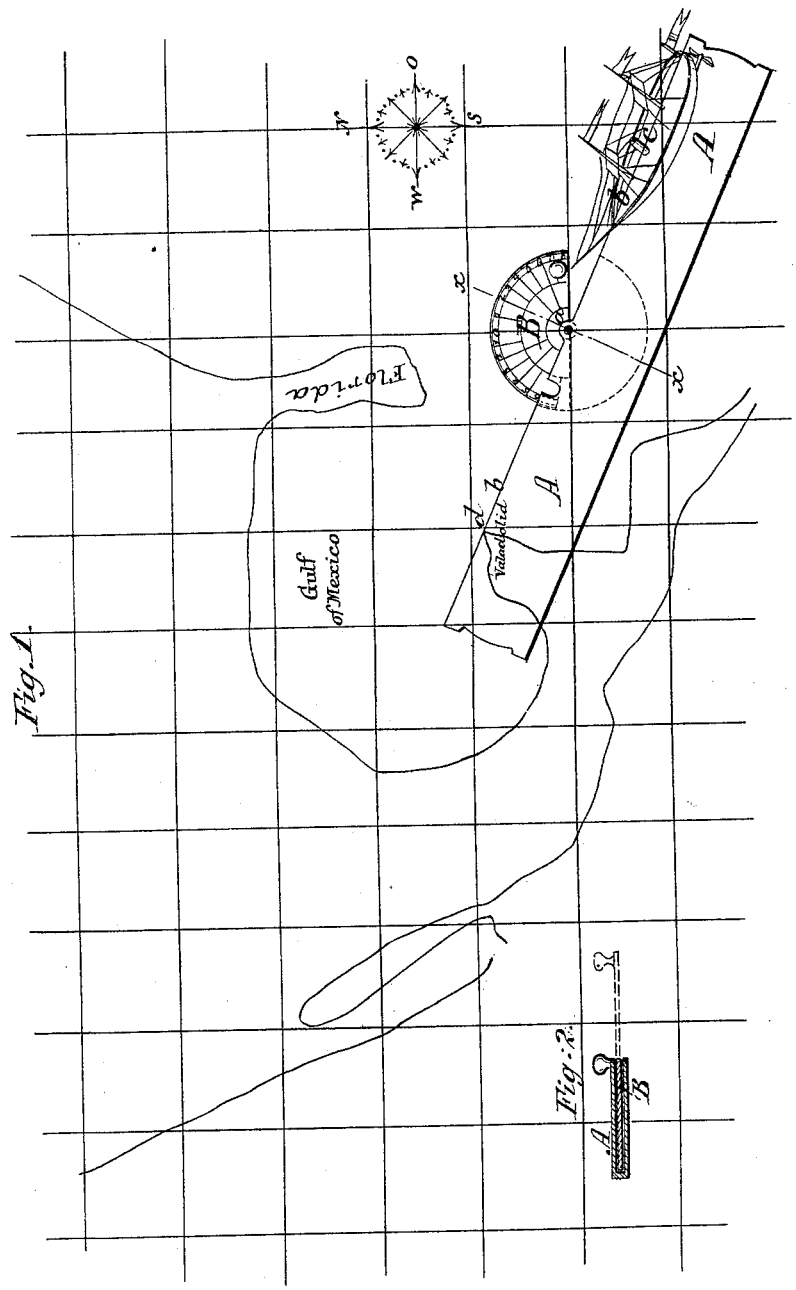

Letters Patent No. 85,991, dated January 19, 1869.

IMPROVEMENT IN COMBINED RULE AND PROTRACTOR.

The Schedule referred to in these Letters Patent and making part of the same.

*To all whom it may concern:*

Be it known that I, REUBEN A. BRIGGS, of the city, county, and State of New York, have invented a new and improved Ruler and Course-Indicator for nautical purposes; and I do hereby declare that the following is a full, clear, and exact description thereof, which will enable others skilled in the art to make and use the same, reference being had to the accompanying drawings, forming part of this specification, in which—

Figure 1 represents a plan or top view of my improved course-indicator.

Figure 2 is a vertical transverse section of the same, taken on the plane of the line $x\ x$, fig. 1.

Similar letters of reference indicate corresponding parts.

This invention relates to a new apparatus for laying down the course of vessels, and for finding directions on charts. It is so arranged that it can also be used for a ruler.

The invention consists in pivoting a protractor to a rule, constructed as will be hereinafter described, so that when the edge of the rule is placed between the required points of the chart, with the centre of the protractor upon one of the meridians or lines of latitude, the direction of the rule on the chart and the course to be steered will be readily obtained by means of the protractor.

A represents a rule, or straight-edge, of suitable construction.

Near its edge is pivoted to it, by means of a pin, $a$, a protractor, B, the axis of said protractor being in line with the straight edge $b$ of the rule.

The apparatus is used, as shown in the drawings, by holding the edge $b$ against that point, $c$, on which the vessel is, and the point $d$ which it wants to reach.

By also holding the axis $a$ upon one of the lines of longitude or latitude on the chart, the chord of the semicircle of the protractor can be brought in line with such meridian or line of latitude as in fig. 1, and the angle then measured on the protractor, by the ruler, indicates the required number of degrees from north or west, south or east, as the ruler may be held on the chart.

Heretofore parallel rulers were used for this purpose, but on a ship which is rolling, or in a heavy sea, it is difficult to hold both plates of a parallel ruler steady, and the required accuracy could not be obtained.

This invention may also be used for surveying or other purposes.

I prefer to have the ruler recessed or slotted for the reception of the protractor, as shown in fig. 2, so that the latter can be folded into the ruler, as shown. Then the instrument will be like an ordinary ruler.

Having thus described my invention,

I claim as new, and desire to secure by Letters Patent—

The combination of the protractor B with the rule A, provided with a slot or depression, and constructed and operating in the manner and for the purpose as set forth.

The above specification of my invention, signed by me, this 13th day of April, 1868.

REUBEN A. BRIGGS.

Witnesses:
ALEX. F. ROBERTS,
J. M. COVINGTON.